(12) United States Patent
Riddoch (10) Patent No.: US 8,447,904 B2
(45) Date of Patent: May 21, 2013

(54) VIRTUALISED INTERFACE FUNCTIONS

(75) Inventor: David Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 116 days.

(21) Appl. No.: 12/637,554

(22) Filed: Dec. 14, 2009

(65) Prior Publication Data

US 2010/0161847 A1    Jun. 24, 2010

(30) Foreign Application Priority Data

Dec. 18, 2008    (GB) .................................. 0823162.3

(51) Int. Cl.
| | | |
|---|---|---|
| G06F 13/38 | (2006.01) | |
| G06F 13/12 | (2006.01) | |
| G06F 3/00  | (2006.01) | |
| G06F 12/00 | (2006.01) | |

(52) U.S. Cl.
USPC .......... 710/74; 710/3; 710/62; 711/6; 711/203

(58) Field of Classification Search
None
See application file for complete search history.

(56) References Cited

U.S. PATENT DOCUMENTS

| | | | |
|---|---|---|---|
| 5,272,599 | A  | 12/1993 | Koenen |
| 5,325,532 | A  |  6/1994 | Crosswy et al. |
| 5,946,189 | A  |  8/1999 | Koenen et al. |
| 6,098,112 | A  |  8/2000 | Ishijima et al. |
| 6,160,554 | A  | 12/2000 | Krause |
| 6,304,945 | B1 | 10/2001 | Koenen |
| 6,349,035 | B1 |  2/2002 | Koenen |
| 6,438,130 | B1 |  8/2002 | Kagan et al. |
| 6,502,203 | B2 | 12/2002 | Barron et al. |
| 6,530,007 | B2 |  3/2003 | Olarig et al. |
| 6,667,918 | B2 | 12/2003 | Leader et al. |

(Continued)

FOREIGN PATENT DOCUMENTS

| | | |
|---|---|---|
| EP | 620521 A2  | 10/1994 |
| WO | 0148972 A1 |  7/2001 |

(Continued)

OTHER PUBLICATIONS

Bilic Hrvoye, et al.; Article in Proceedings of the 9th Symposium on High Performance Interconnects, "Deferred Segmentation for Wire-Speed Transmission of Large TCP Frames over Standard GbE Networks," Aug. 22, 2001, 5pp.

(Continued)

Primary Examiner — Henry Tsai
Assistant Examiner — Michael Sun
(74) Attorney, Agent, or Firm — Haynes Beffel & Wolfeld LLP; Warren S. Wolfeld (57) ABSTRACT

Roughly described, a data processing system comprises a memory addressable by a range of physical memory addresses; a plurality of non-privileged software domains each having a virtual memory address space; a privileged software domain; a memory management unit operable to perform virtual address translation of a virtual memory address into a physical memory address; and an I/O device supporting virtualised interfaces each associated with a respective non-privileged software domain, the I/O device comprising an operation management unit operable to perform virtual address translation in one or more of the virtual memory address spaces; wherein, for I/O operations requested by a virtualised interface, the I/O device invokes the operation management unit to perform virtual address translation for those I/O operations meeting first criteria and to invoke the memory management unit to perform virtual address translation for those I/O operations which do not meet the first criteria.

38 Claims, 1 Drawing Sheet

U.S. PATENT DOCUMENTS

| Patent Number | Date | Inventor(s) | Ref |
|---|---|---|---|
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,073,059 B2 * | 7/2006 | Worely et al. | 713/168 |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,330,942 B2 * | 2/2008 | de Dinechin et al. | 711/152 |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,627,733 B2 * | 12/2009 | Sinclair | 711/203 |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 8,091,090 B2 * | 1/2012 | de Dinechin et al. | 719/310 |
| 8,176,279 B2 * | 5/2012 | Farrell et al. | 711/163 |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0084256 A1 * | 5/2003 | McKee | 711/152 |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0071250 A1 | 4/2004 | Bunton et al. | |
| 2004/0141642 A1 | 7/2004 | Zeng et al. | |
| 2004/0177269 A1 * | 9/2004 | Belnet et al. | 713/200 |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0091652 A1 * | 4/2005 | Ross et al. | 718/1 |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0158690 A1 * | 7/2006 | Willman | 358/1.16 |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0162683 A1 * | 7/2007 | Hattori et al. | 711/6 |
| 2007/0168641 A1 | 7/2007 | Hummel et al. | |
| 2007/0188351 A1 | 8/2007 | Brown et al. | |
| 2007/0220183 A1 | 9/2007 | Kagan et al. | |
| 2008/0024586 A1 | 1/2008 | Barron | |
| 2008/0052711 A1 * | 2/2008 | Forin et al. | 718/100 |
| 2008/0092148 A1 * | 4/2008 | Moertl et al. | 719/321 |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |

FOREIGN PATENT DOCUMENTS

| | | |
|---|---|---|
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |

| | | | |
|---|---|---|---|
| WO | 2011043769 A1 | 4/2011 | |
| WO | 2011053305 A1 | 5/2011 | |
| WO | 2011053330 A1 | 5/2011 | |

OTHER PUBLICATIONS

Bilic Hrvoye, et al.; Presentation slides from 9th Symposium on High Performance Interconnects, "Deferred Segmentation for Wire-Speed Transmission of Large TCP Frames over Standard GbE Networks," Aug. 22, 2001, 9pp.

Bruce Lowekamp, et al.; ACM Computer Communication Review, vol. 31, No. 4, Oct. 2001.

Piyush Shivam, et al.; Proceedings of the 2001 ACM/IEEE conference on Supercomputing, pp. 57, Denver, Nov. 10, 2001.

Robert Ross, et al.; Proceedings of the 2001 ACM/IEEE conference on Supercomputing, pp. 11, Denver, Nov. 10, 2001.

E. Blanton and M. Allman; ACM Computer Communication Review, vol. 32, No. 1, Jan. 2002.

Murali Rangarajan, et al.; Technical Report DCR-TR-481, Computer Science Department, Rutgers University, Mar. 2002.

Jon Crowcroft, Derek McAuley; ACM Computer Communication Review, vol. 32, No. 5, Nov. 2002.

Charles Kalmanek; ACM Computer Communication Review, vol. 32, No. 5, pp. 13-19, Nov. 2002.

Jonathan Smith; ACM Computer Communication Review, vol. 32, No. 5, pp. 29-37, Nov. 2002.

NR Adiga, et al.; Proceedings of the 2002 ACM/IEEE conference on Supercomputing, pp. 1-22, Baltimore, Nov. 16, 2002.

Steven J. Sistare, Christopher J. Jackson; Proceedings of the 2002 ACM/IEEE conference on Supercomputing, p. 1-15, Baltimore, Nov. 16, 2002.

R. Bush, D. Meyer; IETF Network Working Group, Request for Comments: 3439, Dec. 2002.

Pasi Sarolahti, et al.; ACM Computer Communication Review, vol. 33, No. 2, Apr. 2003.

Tom Kelly; ACM Computer Communication Review, vol. 33, No. 2, pp. 83-91, Apr. 2003.

Jeffrey C. Mogul; Proceedings of HotOS IX: The 9th Workshop on Hot Topics in Operating Systems, pp. 25-30, May 18, 2003.

Derek McAuley, Rolf Neugebauer; Proceedings of the ACM SIGCOMM 2003 Workshops, Aug. 2003.

Justin Hurwitz, Wu-chun Feng; Proceedings of the 11th Symposium on High Performance Interconnects, Aug. 20, 2003.

Vinay Aggarwal, et al.; ACM Computer Communication Review, vol. 33, No. 5, Oct. 2003.

Wu-chun Feng, et al.; Proceedings of the 2003 ACM/IEEE conference on Supercomputing, Phoenix, Arizona, Nov. 15, 2003.

Jiuxing Liu, et al.; Proceedings of the 2003 ACM/IEEE conference on Supercomputing, Phoenix, Arizona, Nov. 15, 2003.

Srihari Makineni and Ravi Iyer; Proceedings of the 10th International Symposium on High Performance Computer Architecture, pp. 152, Feb. 14, 2004.

Cheng Jin, et al.; Proceedings of IEEE Infocom 2004, pp. 1246-1259, Mar. 7, 2004.

Andy Currid; ACM Queue, vol. 2, No. 3, May 1, 2004.

Greg Regnier, et al.; Computer, IEEE Computer Society, vol. 37, No. 11, pp. 48-58, Nov. 2004.

Gregory L. Chesson; United States District Court, Northern District California, San Francisco Division, Feb. 4, 2005.

Edward D. Lazowska, David A. Patterson; ACM Computer Communication Review, vol. 35, No. 2, Jul. 2005.

W. Feng, et al.; Proceedings of the 13th Symposium on High Performance Interconnects, Aug. 17, 2005.

B. Leslie, et al.; J. Comput. Sci. & Technol., vol. 20, Sep. 2005.

P. Balaji, et al.; Proceedings of the IEEE International Conference on Cluster Computing, Sep. 2005.

Humaira Kamal, et al.; Proceedings of the 2005 ACM/IEEE conference on Supercomputing, Seattle, p. 30, Washington, Nov. 12, 2005.

Sumitha Bhandarkar, et al.; ACM Computer Communication Review, vol. 36, No. 1, pp. 41-50, Jan. 2006.

H. K. Jerry Chu; Proceedings of the USENIX Annual Technical Conference 1996, Jan. 1996.

Ken Calvert; ACM Computer Communication Review, vol. 36, No. 2, pp. 27-30, Apr. 2006.

Jon Crowcroft; ACM Computer Communication Review, vol. 36, No. 2, pp. 51-52, Apr. 2006.

Greg Minshall, et al.; ACM Computer Communication Review, vol. 36, No. 3, pp. 79-92, Jul. 2006.

David Wetherall; ACM Computer Communication Review, vol. 36, No. 3, pp. 77-78, Jul. 2006.

Patrick Geoffray; HPCWire article: http://www.hpcwire.com/features/17886984.html, Aug. 18, 2006.

Geoffray P., "Protocol off-loading vs on-loading in high-performance networks," 14th Symposium on High Performance Interconnects, Aug. 23, 2006, 5pp.

Jose Carlos Sancho, et al.; Proceedings of the 2006 ACM/IEEE conference on Supercomputing, Tampa, Florida, Nov. 11, 2006.

Sayantan Sur, et al.; Proceedings of the 2006 ACM/IEEE conference on Supercomputing, Tampa, Florida, Nov. 11, 2006.

Steven Pope, David Riddoch; ACM Computer Communication Review, vol. 37, No. 2, pp. 89-92, Mar. 19, 2007.

Kieran Mansley, et al.; Euro-Par Conference 2007, pp. 224-233, Rennes, France, Aug. 28, 2007.

M. Kaiserswerth; IEEE/ACM Transactions in Networking vol. 1, Issue 6, pp. 650-663, Dec. 1993.

Danny Cohen, et al.; ACM Computer Communication Review, vol. 23, No. 4, p. 32-44, Jul. 1993.

J. Evans and T. Buller; IEEE TCGN Gigabit Networking Workshop, Apr. 22, 2001.

M.V. Wilkes and R.M. Needham; ACM SIGOPS Operating Systems Review, vol. 14, Issue 1, pp. 21-29, Jan. 1980.

Dickman, L., "Protocol OffLoading vs OnLoading in High Performance Networks," 14th Symposium on High Performance Interconnects, Aug. 23, 2006, 8 pp.

Mogul J., "TCP offload is a dumb idea whose time has come," USENIX Assoc., Proceedings of HotOS IX: The 9th Workshop on Hot Topics in Operating Systems, May 2003, pp. 24-30.

Petrini F., "Protocol Off-loading vs On-loading in High-Performance Networks," 14th Symposium on High Performance Interconnects, Aug. 23, 2006, 4pp.

Regnier G., "Protocol Onload vs. Offload," 14th Symposium on High Performance Interconnects, Aug. 23, 2006, 1pp.

Montry G., OpenFabrics Alliance presentation slides, 14th Symposium on High Performance Interconnects, Aug. 23, 2006, 8pp.

European Search Report mailed May 20, 2010 in EP 09177938.9.

Gordon E. Moore; Electronics, vol. 38, No. 8, pp. 114-117, Apr. 19, 1965.

Jack B. Dennis and Earl C. Van Horn; Communications of the ACM, vol. 9, No. 3, pp. 143-155, Mar. 1966.

Marvin Zelkowitz; Communications of the ACM, vol. 14, No. 6, p. 417-418, Jun. 1971.

J. Carver Hill; Communications of the ACM, vol. 16, No. 6, p. 350-351, Jun. 1973.

F.F. Kuo; ACM Computer Communication Review, vol. 4 No. 1, Jan. 1974.

Vinton Cerf, Robert Kahn; IEEE Transactions on Communications, vol. COM-22, No. 5, pp. 637-648, May 1974.

V. Cerf, et al.; ACM Computer Communication Review, vol. 6 No. 1, p. 1-18, Jan. 1976.

Robert M. Metcalfe and David R. Boggs; Communications of the ACM, vol. 19, Issue 7, pp. 395-404, Jul. 1976.

P. Kermani and L. Kleinrock; Computer Networks, vol. 3, No. 4, pp. 267-286, Sep. 1979.

John M. McQuillan, et al.; Proceedings of the 6th Data Communications Symposium, p. 63, Nov. 1979.

Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.

John Nagle; ACM Computer Communication Review, vol. 14, No. 4, p. 11-17, Oct. 1984.

Robert M. Brandriff, et al.; ACM Computer Communication Review, vol. 15, No. 4, Sep. 1985.

C. Kline; ACM Computer Communication Review, vol. 17, No. 5, Aug. 1987.

Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.

Parry Husbands and James C. Hoe; Proceedings of the 1998 ACM/IEEE conference on Supercomputing, p. 1-15, Orlando, Florida, Nov. 7, 1998.

Michael S. Warren, et al.; Proceedings of the 1998 ACM/IEEE conference on Supercomputing, Orlando, Florida, Nov. 7, 1998.

John Salmon, et al.; Proceedings of the 1998 ACM/IEEE conference on Supercomputing, Orlando, Florida, Nov. 7, 1998.

Boon S. Ang, et al.; Proceedings of the 1998 ACM/IEEE conference on Supercomputing, Orlando, Florida, Nov. 7, 1998.

S. L. Pope, et al.; Parallel and Distributed Computing and Networks, Brisbane, Australia, Dec. 1998.

M. de Vivo, et al.; ACM Computer Communication Review, vol. 29, No. 1, pp. 81-85, Jan. 1999.

M. Allman; ACM Computer Communication Review, vol. 29, No. 3, Jul. 1999.

Steve Muir and Jonathan Smith; Technical Report MS-CIS-00-04, University of Pennsylvania, Jan. 2000.

Patrick Crowley, et al.; Proceedings of the 14th international conference on Supercomputing, pp. 54-65, Santa Fe, New Mexico, May 8, 2000.

Jonathan Stone, Craig Partridge; ACM Computer Communication Review, vol. 30, No. 4, pp. 309-319, Oct. 2000.

W. Feng and P. Tinnakornsrisuphap; Proceedings of the 2000 ACM/IEEE conference on Supercomputing, Dallas, Texas, Nov. 4, 2000.

Jenwei Hsieh, et al.; Proceedings of the 2000 ACM/IEEE conference on Supercomputing, Dallas, Texas, Nov. 4, 2000.

Ian Pratt and Keir Fraser; Proceedings of IEEE Infocom 2001, pp. 67-76, Apr. 22, 2001.

European search report for examination of EP 09 177 938.9 dated Nov. 7, 2011, 2 pp.

* cited by examiner

FIG. 1

(PRIOR ART)

FIG. 2

VIRTUALISED INTERFACE FUNCTIONS

BACKGROUND OF THE INVENTION

This invention relates to data transfer in a data processing system supporting virtualised input/output devices. In particular, this invention relates to an improved technique by which translation and protection of virtual memory addresses is performed in a virtualised data processing system.

High performance I/O (input/output) devices of a data processing system are typically able to access host memory directly via Direct Memory Access (DMA). That is, they are able to read the contents of memory and write data to memory directly, without mediation by host software. The addresses from which a device reads and to which it writes are typically supplied by a device driver.

Figure 1:
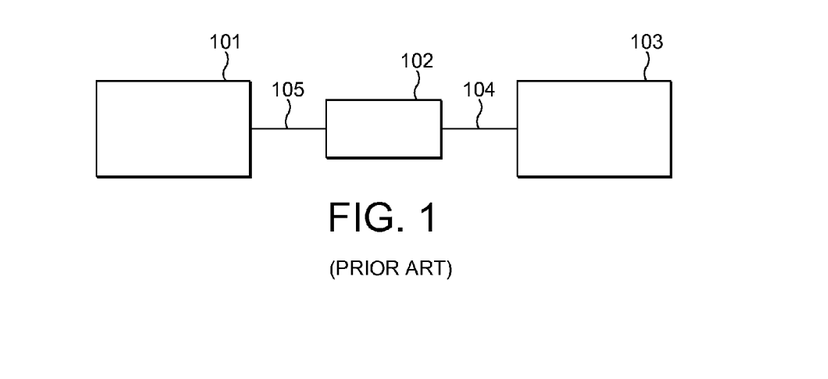
FIG. 1 is a schematic diagram which shows a typical relationship between an I/O device and host memory.

With reference to FIG. 1, in some systems the addresses used by a device 103 to access host memory 101 do not correspond directly with physical memory addresses. In these systems, I/O addresses on the I/O bus 104 must be translated into machine physical addresses on the system bus 105. This translation is generally performed at a device called an I/O Memory Management Unit (IOMMU) 102. An IOMMU may perform either or both of translation services (converting I/O addresses to machine physical addresses) and protection services (limiting the range of machine physical addresses that are accessible by individual devices, or all devices on an I/O bus).

To maintain the integrity of a data processing system it is essential that an I/O device only write into regions of host memory that are intended for I/O. In conventional monolithic systems, the device driver for an I/O device is a trusted component of the system that is generally supported at the kernel, and so can be relied upon to supply valid addresses for I/O buffers in host memory.

In virtualised systems, a single host supports multiple guest system images, each running an untrusted operating system instance. The host and guests are managed by a trusted hypervisor (or more generally a privileged software domain or domains). Typically only the hypervisor has direct access to I/O devices, and forwards I/O requests from guests via a software indirection. Guests cannot be given direct access to the physical interface of conventional I/O devices which are designed to be exclusively accessed by a single trusted device driver, and because a device driver of a guest operating system is not trusted to supply valid addresses for DMA.

The mediation of the hypervisor in the I/O path adds significant overhead and reduces performance through additional processing, context switches and copy operations. In order to address this inefficiency it is desirable to grant guests direct access to I/O devices. This can be achieved in paravirtualised systems whilst maintaining system integrity by arranging that:

(i) I/O devices provide multiple virtual interfaces; at least one for each guest that will access the device directly.
(ii) addresses supplied to the I/O device by device drivers in untrusted guests are translated in a secure manner to machine physical addresses that correspond to memory allocated to the guest.

The second requirement is necessary to ensure that a guest cannot compromise system integrity by causing the I/O device to write to areas of host memory belonging to other guests or the hypervisor, and to prevent the guest reading from areas of memory it is not authorised to access. Translation and protection of guest I/O addresses to machine physical addresses is conventionally performed at a system IOMMU.

The PCI-IOV (Peripheral Component Interconnect—I/O Virtualisation) architecture was designed to address the problem of supporting DMA by I/O devices using addresses supplied by untrusted guests. PCI-IOV defines a standard by which a device can export multiple interfaces (one to each guest) and perform secure address translation and protection for DMA transfers on a per-guest basis. In the PCI-IOV architecture the translation and protection are performed in an IOMMU.

Under the PCI-IOV standard, each of the exported interfaces is referred to as a Virtual Function (VF). A guest is given direct access to a VF which it uses to initiate I/O requests. Each device also has at least one Physical Function (PF) that is typically used by a privileged device driver in the hypervisor to manage the device, and may also be used in some cases for control and data-path operations. A PF is the physical interface defined by the PCI Express base specification to which PCI-IOV is an extension.

Each VF and PF is assigned a unique Requester ID (RID). By extension, each RID is therefore associated with a particular protection domain (guest or hypervisor) of a virtualised system. When an I/O device initiates an I/O operation request using an I/O address supplied by a guest (by means of a VF), it uses that guest's RID in the request so that the IOMMU (referred to as a Translation Agent (TA) under the PCI-IOV standard) can translate the guest I/O address to a machine physical address accessible to the I/O bus. Typically, the I/O addresses used by a PF are not translated—or have a simple fixed translation—and require no protection.

Under the PCI-IOV standard, a guest can invoke an I/O device via a VF to request an I/O operation, specifying one or more guest I/O addresses. In response the device issues requests on the I/O bus with the RID that corresponds to the guest. The IOMMU uses the RID to identify a mapping from guest I/O addresses to machine physical addresses of memory accessible to the guest. The IOMMU issues an error if the I/O address is not valid for the particular protection domain (guest).

The translation of addresses at the IOMMU can be a bottleneck for a virtualised data processing system. To address this, some I/O devices are able to request that addresses be pre-translated by the IOMMU, and the translated addresses are cached on the I/O device. The device can then issue requests with the pre-translated addresses, and when it does so it tells the IOMMU that no further translation is needed. The protocol for managing the caching of translations over PCI is formalised in the Address Translation Services (ATS) specification. However, this scheme is complex and expensive to implement in terms of hardware and software design.

There is therefore a need for an improved technique by which translation and protection is performed in a system supporting virtualised I/O devices.

SUMMARY OF THE INVENTION

According to a first aspect of the present invention there is provided a data processing system comprising: a memory addressable by a range of physical memory addresses; a plurality of non-privileged software domains each having a virtual memory address space; at least one privileged software domain; a memory management unit operable to perform virtual address translation of a virtual memory address into a physical memory address; and an input and/or output device supporting a plurality of virtualised interfaces, each virtualised interface being associated with a respective one of the non-privileged software domains, the input and/or output device further comprising at least one operation management unit operable to perform virtual address translation in one or more of the virtual memory address spaces; wherein, for I/O operations requested by a virtualised interface of the input and/or output device, the input and/or output device is configured to invoke the operation management unit to perform virtual address translation for those I/O operations meeting one or more predefined first criteria and to invoke the memory management unit to perform virtual address translation for those I/O operations which do not meet the one or more predefined first criteria.

Preferably each virtualised interface of the input and/or output device is assigned a unique identifier, and an I/O operation requested by a particular virtualised interface uses the identifier of that interface. Preferably the input and/or output device provides a physical interface having a unique identifier. Preferably the input and/or output device is configured to use the identifier of its physical interface for those I/O operations which meet the one or more predefined first criteria.

Preferably the operation management unit is further operable to perform memory protection by preventing I/O operations requested by a particular virtualised interface of the Input and/or output device from accessing areas of the memory which the software domain associated with that virtualised interface is not permitted to access, and the input and/or output device is further configured to invoke the operation management unit to perform memory protection for the said input and/or output operations meeting one or more predefined second criteria.

Preferably the memory management unit is further operable to perform memory protection by preventing I/O operations requested by a particular virtualised interface of the input and/or output device from accessing areas of the memory which the software domain associated with that virtualised interface is not permitted to access, and the input and/or output device is further configured to invoke the memory management unit to perform memory protection for the said input and/or output operations which do not meet the one or more predefined second criteria.

Suitably the predefined first and second criteria are the same criteria.

Suitably the predefined first and second criteria are chosen such that the operation management unit is configured to perform virtual address translation for all I/O operations requested by at least one virtualised interface of the input and/or output device and the memory management unit is configured to perform memory protection for all those I/O operations.

Suitably the predefined first and second criteria are chosen such that the operation management unit is configured to perform memory protection for all I/O operations requested by at least one virtualised interface of the input and/or output device and the memory management unit is configured to perform virtual address translation for all those I/O operations.

Preferably the input and/or output device is configured to use the identifier of its physical interface for those I/O operations which meet the one or more predefined first criteria and the one or more predefined second criteria.

Preferably the input and/or output device is configured to use the identifier of the virtualised interface requesting the I/O operation for those I/O operations which do not meet either the one or more predefined first criteria or the one or more predefined second criteria.

Preferably the one or more predefined second criteria include the identifier of the virtualised interface such that memory protection for a particular I/O operation is selectively performed at the memory management unit or the operation management unit in dependence on which virtualised interface is requesting the I/O operation.

Preferably the one or more predefined first criteria include the identifier of the virtualised interface such that virtual address translation for a particular I/O operation is selectively performed at the memory management unit or the operation management unit in dependence on which virtualised interface is requesting the I/O operation.

Suitably the one or more predefined first criteria includes the type of I/O operation. Suitably the one or more predefined second criteria includes the type of I/O operation.

The input and/or output device may be a network interface device. The I/O operation types may include DMA reads, DMA writes, control path operations, data path operations and an interrupts. Preferably the one or more predefined first criteria are chosen such that virtual address translation for I/O operations belonging to a control path are performed at the memory management unit and virtual address translation for I/O operations belonging to the data path are performed at the operation management unit. I/O operations belonging to the control path may include descriptor fetches, interrupts, configuration operations and notification operations. Preferably the one or more predefined first criteria are chosen such that virtual address translation for data transmission operations and interrupts are performed at the memory management unit and virtual address translation for data reception operations, descriptor operations and completion operations are performed at the operation management unit.

Suitably at least one of the non-privileged software domains supports at least one application having a lower privilege level than its supporting domain, each application being granted access to the virtualised interface associated with its supporting domain and to an application memory address space within the address space of the supporting domain. Preferably, for I/O operations requested on behalf of an application, the input and/or output device is configured to: (i) at the operation management unit, perform translation of an application memory address into a virtual memory address of the supporting domain; and (ii) subsequently, invoke the memory management unit to perform virtual address translation of the virtual memory address into a physical memory address.

Preferably each application is granted direct access to a sub-interface of the virtualised interface of the supporting domain and each sub-interface is assigned a unique identifier. Preferably the one or more predefined first criteria are chosen such that the memory management unit performs virtual address translation of the virtual memory address into a physical memory address Preferably the predefined criteria are stored at the input and/or output device. Preferably a device driver supported at the privileged software domain is configured to maintain the predefined criteria stored at the input and/or output device.

Preferably the input and/or output device comprises a plurality of the said operation management units, each operation management unit being supported at one of the virtualised interfaces, and, on invoking the operation management unit, the input and/or output device is configured to invoke the instance of the operation management unit supported at the virtualised interface requesting the I/O operation.

Preferably the privileged software domain maintains a memory address translation table. Preferably the input and/or output device maintains a copy of the translation table.

Suitably the privileged software domain is a hypervisor and the non-privileged software domains are guest operating systems supported by the hypervisor.

Suitably the privileged software domain is an operating system kernel and the non-privileged software domains are user level entities supported by the kernel.

Suitably the input and/or output device is a PCI Express device and the virtualised interfaces of the input and/or output device are provided in accordance with the PCI-IOV specification. Each identifier may be a PCI Requester ID.

According to a second aspect of the present invention there is provided a method for handling virtual memory addresses at a data processing system comprising a memory and an input and/or output device, the data processing system supporting (a) at least one privileged software domain and (b) a plurality of non-privileged software domains each having a virtual memory address space and each being associated with a respective virtualised interface of the input and/or output device, the method comprising: receiving at a virtualised interface of the input and/or output device at least one virtual memory address from the respective one of the non-privileged software domains; the virtualised interface requesting an I/O operation using the at least one virtual memory address; determining at the input and/or output device whether the I/O operation request meets one or more predefined first criteria; and: if the one or more first criteria are met, performing translation of the virtual memory address into a physical memory address at the input and/or output device; otherwise, invoking a memory management unit of the data processing system to perform translation of the virtual memory address into a physical memory address.

Preferably the method further comprises: determining at the input and/or output device whether the I/O operation request meets one or more predefined second criteria; and: if the one or more predefined second criteria are met, preventing the I/O operation requested by the virtualised interface from accessing areas of the memory which the non-privileged software domain associated with the virtualised interface is not permitted to access; otherwise, invoking a memory management unit of the data processing system to perform memory protection for the I/O operation.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
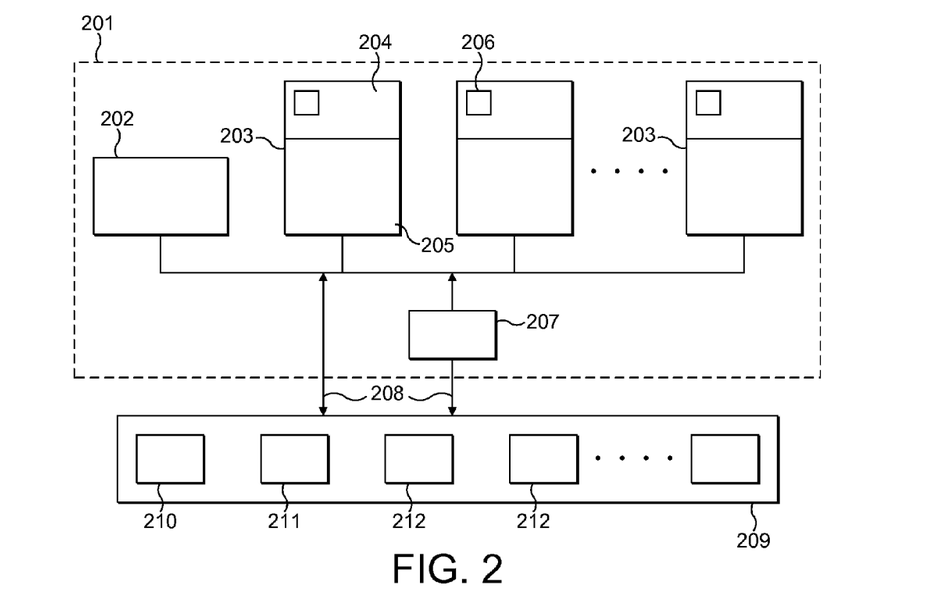
FIG. 2 is a schematic diagram which shows a data processing system configured in accordance with the present invention.

FIG. 2 shows hardware and software elements of a data processing system configured in accordance with the present invention. The host system 201 of the data processing system supports input/output (I/O) device 209, which could be a network interface device, graphics card or other peripheral device. Preferably I/O device 209 is coupled to host system 201 by means of a PCI Express interface (not shown).

Host system 201 supports a plurality of software domains 202 and 203. In the embodiment shown in FIG. 2, the host system is virtualised: software domain 202 is a privileged software domain (for example, a hypervisor under the VMWare architecture) and software domains 203 are non-privileged guest domains (for example, untrusted guest operating systems). The host system and guest domains are managed by trusted software domain(s) 202 (there may be more than one). Thus, trusted domain 202 allocates hardware resources to guest domains 203 and controls their access to I/O devices.

Typically, each guest domain is an instance of an operating system having a kernel 205 and supporting applications 206 at user level 204. The guest domains have a lower privilege level than trusted domain 202—for example, on an x86 system, trusted domain might operate at privilege level CPL0, the guest operating systems 205 at CPL1-2 and applications 206 at CPL3. The software domains of host system 201 have access to host memory, with trusted domain 202 allocating regions of physical memory to each of the guest domains. Each guest domain addresses its region by means of a virtual address space.

Host system 201 can access one or more I/O devices 209 by means of data bus 208. Preferably the bus is a PCI Express (PCIe) data bus and the I/O devices 209 are PCIe devices. Each I/O device 209 provides an interface by means of which it can communicate with host system 201 over bus 208. Logically, this physical interface is represented by physical interface 210, which is referred to as a physical function, or PF, in the PCIe specification. An I/O device may have more than one PF and a single device may support many different types of PF—for example, a network interface, a data storage interface, etc.

Each I/O device 209 further provides two or more virtual interfaces, one for each of the guest domains 203. Preferably these virtual interfaces are configured in accordance with the PCI-IOV specification, in which virtual interfaces are referred to as virtual functions (VFs). Each of the guest domains 203 is operable to access the particular one of the virtual interfaces of I/O device 209 with which it is associated and invoke that virtual interface to perform I/O operations by means of I/O operation requests that include the virtual memory addresses of the guest domain to which or from which the I/O data is to be written.

In order for an I/O device to access host memory, the host system must receive the physical memory address from which data is to be read, or to which data is to be written. However, a guest software domain does not have access to the physical memory address space and can only provide virtual memory addresses. Memory management unit 207 (an IOMMU as described above) is therefore required on bus 208 to translate the virtual memory addresses provided in an I/O request into physical memory addresses understood by the host memory subsystems. In a system having the PCI-IOV architecture, IOMMU 207 is referred to as a translation agent (TA), which is typically a hardware functionality provided with access to translation tables maintained by trusted domain 202. Alternatively, IOMMU 207 could be at least partially embodied in software.

In addition to translating virtual memory addresses, an IOMMU can be configured to provide protection functions for host memory. For example, the IOMMU can be configured only to allow I/O operations on behalf of a particular guest domain access to those memory areas which the trusted domain indicates that that guest domain is allowed to access. An error may be returned for any virtual addresses which translate to physical memory addresses outside the regions of memory to which a particular guest domain is permitted access.

Trusted domain 202 can communicate directly with I/O device 209 over bus 208 using I/O requests that include physical memory addresses. Trusted domain 202 typically accesses physical interface 210 of the I/O device. No virtual address translation (or a simple fixed translation) is therefore required at IOMMU 207 for I/O operations on behalf of the trusted domain between an I/O device and host memory. Furthermore, I/O requests on behalf of privileged domain 202 need not be protected because the software domain is trusted.

Each physical and virtual interface of the I/O device is preferably assigned an identifier which it uses in its I/O requests so as to identify which of the I/O interfaces is making the request. This interface identifier is referred to as the requester ID (RID) in the PCI-IOV standard, and it unique to each PF and VF. Since each interface of the I/O device is associated with a particular software domain of the host system, an identifier also identifies on behalf of which software domain an I/O request is being made. Using this identifier allows IOMMU 207 of the host system to determine (a) whether the software domain is permitted to perform the requested I/O operation (the protective function), and (b) in which virtual address space the virtual memory addresses are defined (the translation function). One or both of the protective and translation functions may be performed at the IOMMU.

In accordance with the present invention, I/O device 209 further includes translation and protection unit (TPU) 211. TPU 211 is operable to perform the translation of virtual memory addresses provided by guest domains into physical memory addresses. TPU 211 is further operable to protect host memory by only allowing I/O operations to access those memory areas which are accessible to the software domain corresponding to the RID carried in the I/O request. I/O requests directed to virtual memory addresses that are translated at TPU 211 are passed to the host system with the translated physical memory addresses and having the RID of the physical interface (PF). Such I/O requests do not therefore require translation or protection by IOMMU 207.

In order to perform virtual address translation, TPU must have access to an address translation table or database. So as to minimise lookups over bus 208, it is advantageous for the translation table to be supported at the I/O device. Preferably the translation table is maintained by a device driver of trusted domain 202, or another trusted entity. The device driver can be arranged to update the translation table of the I/O device with any modifications to the mappings between virtual and physical addresses that are maintained by trusted domain 202.

By providing means for translating and/or protecting virtual memory addresses at the I/O device, the I/O device can choose whether to perform translation and/or protection functions at the I/O device or, as is conventional, at the IOMMU. This has several advantages.

The performance of I/O operations on behalf of a physical function is generally better than that of I/O operations on behalf of virtual functions of an I/O device. This is because the memory addresses used by a PF are not subject to the translation and protection bottlenecks typically present at an IOMMU (or a simple fixed translation may be required). Translation table lookups performed by an IOMMU to determine the physical memory addresses represented by a set of virtual memory addresses can be slow—typically the translation table will be supported in host memory. Various caching schemes exist to improve the performance of address translation but these schemes are complex and expensive to implement in hardware. Their benefit is particularly limited in systems having a large number of virtualised interfaces and guest domains due to the number of different virtual address spaces which must be supported. Replacing I/O operations having a high translation overhead with I/O operations having a much lower translation overhead, provides significant I/O performance increases.

Preferably the I/O device can select between performing virtual address translation and/or protection at the I/O device and at IOMMU 207. This selection is performed on-the-fly at the I/O device for I/O operations in dependence on the characteristics of each operation. If an I/O operation meets one or more predefined characteristics, translation and/or protection is performed at TPU 211, otherwise translation and/or protection is performed at IOMMU 207.

The predefined characteristics are preferably determined by a trusted entity of privileged domain 202, such as the I/O device driver. The characteristics may be set at runtime—for example, during initialisation of the I/O device. The predefined characteristics may be determined in dependence on the type of I/O device and the particular architecture of the data processing system. The predefined characteristics may be configurable by a user of the data processing system having the necessary privilege level.

The present invention may be applied to a data processing system supporting any type of I/O device, including network interface devices, data storage devices and display adapters. If the I/O device is a network interface device, the predefined characteristics of I/O operations which causes the I/O device to invoke its TPU to perform translation and/or protection functions may be any of the following:

I/O operations associated with the receive path; those associated with the transmit path are handled by the IOMMU.

I/O operations associated with the control path; those associated with the data path are handled by the IOMMU.

I/O write operations to host memory; I/O read operations from host memory are handled by the IOMMU.

More generally, the types of I/O operation performed by a network interface device (and which represent characteristics based on which the I/O device could select whether translation and/or protection is to be performed at the I/O device or at the IOMMU) include:

Transfers of data for transmission (Tx)
Transfers of received data (Rx)
Tx descriptor fetches
Rx descriptor fetches
Completion notifications
Interrupts The determination as to whether memory translation and protection functions should be handled at the I/O device or IOMMU may be based on analogous I/O operation types for other types of I/O device.

Preferably the predefined criteria are set in hardware at the I/O device—for example, for each virtualised interface of the I/O device and for each of a set of types of I/O operations, a stored bit in a register could indicate whether a particular operation should be handled at the I/O device or at the IOMMU.

More than one translation and/or protection unit 211 may be supported at the I/O device. In one embodiment of the present invention, each of the virtual interfaces of the I/O device supports a TPU 211, with the I/O operations requested by a particular virtualised interface (and meeting the predefined criteria) being handled by the TPU of that interface. Each TPU may have its own set of predefined criteria.

In preferred embodiments of the present invention, each virtual interface has an identifier which it uses in the I/O operation requests it generates. A virtual interface identifier may be assigned by a trusted entity of the privileged domain, such as a device driver, or it may be assigned by an entity of the I/O device, such as its physical interface. In I/O devices configured in accordance with the PCI-IOV specification, an identifier of a virtual interface is referred to as a requester ID (RID). By including an identifier with I/O operation requests, entities that receive the request (such as an IOMMU) can identify which virtual interface is making the request. Furthermore, since each virtual interface is associated with a particular one of the guest software domains, those receiving entities can also identify on behalf of which guest domain the request is being made, and therefore in which virtual address space the addresses for translation are defined.

In preferred embodiments of the present invention, when the TPU 211 of the I/O device performs virtual address translation for an I/O operation requested by a virtual interface, it replaces the identifier of that virtual interface with the identifier of the physical interface. This ensures that further translation/protection of the I/O request does not occur at IOMMU 207 when it is transmitted over bus 208 to host system 201. Thus, according to an aspect of the present invention, when performing I/O operations the I/O device is enabled to choose between using the identifier of the virtual interface (and allowing translation and/or protection to be performed at the IOMMU) and using the identifier of the physical interface (by performing translation and/or protection at a TPU).

Alternatively, the I/O device may be configured to perform only one of translation or protection at its TPU, and allow the IOMMU to perform the remaining function. For example, TPU 211 could perform virtual address translation for an I/O request and leave the identifier of the virtual interface making the request unmodified such that the IOMMU will perform its function—in this case the IOMMU is configured to perform memory protection.

It is sometimes advantageous to perform address translation and protection steps at both the I/O device and at the system IOMMU. This allows the virtualised I/O device to support software domains having multiple levels of privilege, with each privilege level being allowed to access different areas of memory. In virtualised data processing systems, a guest software domain typically supports at least two privilege levels: that of the guest operating system kernel and that of the user-level applications supported by the guest operating system, the guest OS kernel having a higher privilege level than the applications. It can be advantageous to grant user-level applications direct access to an I/O device by allowing the applications to address a virtualised interface of the I/O device. In this case it is necessary to ensure that I/O operations initiated by the virtualised interface of the device only access those areas of host memory that are allocated to the application.

Each guest domain of the data processing system is assigned a virtualised interface of the I/O device. The kernel of the guest domain is permitted to access all the memory regions allocated to the guest. In order to allow an application supported at the guest domain to access the virtualised interface of the I/O device, a sub-interface within the virtualised interface assigned to the guest domain is allocated to the application. The sub-interface holds information such as which regions of the virtual address space of the guest domain are accessible to the application for which the sub-interface is provided. This allows a TPU of I/O device (preferably a TPU supported at the virtualised interface) to perform translation and protection for I/O requests formed using virtual memory addresses provided by the application. Addresses presented by the application to the interface are thus first translated by the TPU to addresses within the virtual address space of the guest domain supporting the application. The IOMMU is configured to translate I/O requests made on behalf of the guest domain such that the virtual memory addresses translated by the TPU are subsequently translated into physical addresses by the IOMMU.

A virtualised interface 212 may support multiple sub-interfaces. Preferably a first sub-interface is allocated to the guest domain and subsequent sub-interfaces are allocated to applications supported at that guest domain.

In other embodiments of the present invention, the non-privileged software domains 203 are application domains and trusted domain 202 is the kernel of an operating system. In these embodiments, the I/O device may provide a virtualised function for each application in the manner described herein.

The present invention has been described in relation to the PCIe and PCI-IOV standards. However, the principles described herein apply generally to virtualised systems and I/O devices and are not limited to systems configured according to the PCIe architecture.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system comprising:
a memory addressable by a range of physical memory addresses;
at least one first software domain having a first privilege level and supporting a trusted I/O management entity;
a plurality of second software domains each having a privilege level which is below the first privilege level and each having a virtual memory address space;
a memory management unit configured to perform virtual address translation of a virtual memory address into a physical memory address; and
an input and/or output device supporting a plurality of virtualised interfaces, each virtualised interface being associated with a respective one of the non-privileged software domains, the input and/or output device further comprising an address translation data store maintained up-to-date by the trusted I/O management entity and at least one operation management unit having access to the address translation data store and being configured to perform virtual address translation in one or more of the virtual memory address spaces;
wherein, for I/O operations requested by a virtualised interface of the input and/or output device, the input and/or output device is configured to invoke the operation management unit to perform virtual address translation for those I/O operations meeting one or more predefined first criteria and to invoke the memory management unit to perform virtual address translation for those I/O operations which do not meet the one or more predefined first criteria.

2. The data processing system as claimed in claim 1, wherein each virtualised interface of the input and/or output device is assigned a unique identifier, and an I/O operation requested by a particular virtualised interface uses the identifier of that interface.

3. The data processing system as claimed in claim 2, wherein the input and/or output device provides a physical interface having a unique identifier.

4. The data processing system as claimed in claim 1, wherein each virtualised interface of the input and/or output device is assigned a unique identifier,
wherein the input and/or output device provides a physical interface having a unique identifier,
and wherein the input and/or output device is configured to use the identifier of its physical interface for those I/O operations which meet the one or more predefined first criteria.

5. The data processing system as claimed in claim 1, wherein the operation management unit is further configured to perform memory protection by preventing I/O operations requested by a particular virtualised interface of the Input and/or output device from accessing areas of the memory which the software domain associated with that virtualised interface is not permitted to access, and the input and/or output device is further configured to invoke the operation management unit to perform memory protection for the said input and/or output operations meeting one or more predefined second criteria.

6. The data processing system as claimed in claim 5, wherein the memory management unit is further configured to perform memory protection by preventing I/O operations requested by a particular virtualised interface of the input and/or output device from accessing areas of the memory which the software domain associated with that virtualised interface is not permitted to access, and the input and/or output device is further configured to invoke the memory management unit to perform memory protection for the said input and/or output operations which do not meet the one or more predefined second criteria.

7. The data processing system as claimed in claim 5, wherein the predefined first and second criteria are the same criteria.

8. The data processing system as claimed in claim 1, wherein the memory management unit is further configured to perform memory protection by preventing I/O operations requested by a particular virtualised interface of the input and/or output device from accessing areas of the memory which the software domain associated with that virtualised interface is not permitted to access,
and wherein the predefined first criteria are chosen such that the operation management unit is configured to perform virtual address translation for all I/O operations requested by at least one virtualised interface of the input and/or output device and the memory management unit is configured to perform memory protection for all those I/O operations.

9. The data processing system as claimed in claim 1, wherein the operation management unit is further configured to perform memory protection by preventing I/O operations requested by a particular virtualised interface of the Input and/or output device from accessing areas of the memory which the software domain associated with that virtualised interface is not permitted to access,
and wherein the predefined first and second criteria are chosen such that the operation management unit is configured to perform memory protection for all I/O operations requested by at least one virtualised interface of the input and/or output device and the memory management unit is configured to perform virtual address translation for all those I/O operations.

10. The data processing system as claimed in claim 5, wherein each virtualised interface of the input and/or output device is assigned a unique identifier, and wherein the input and/or output device further provides a physical interface having a unique identifier, and wherein the input and/or output device is configured to use the identifier of its physical interface for those I/O operations which meet the one or more predefined first criteria and the one or more predefined second criteria.

11. The data processing system as claimed in claim 10, wherein the input and/or output device is configured to use the identifier of the virtualised interface requesting the I/O operation for those I/O operations which do not meet either the one or more predefined first criteria or the one or more predefined second criteria.

12. The data processing system as claimed in claim 5, wherein each virtualised interface of the input and/or output device is assigned a unique identifier,
and wherein the one or more predefined second criteria include the identifier of the virtualised interface such that memory protection for a particular I/O operation is selectively performed at the memory management unit or the operation management unit in dependence on which virtualised interface is requesting the I/O operation.

13. The data processing system as claimed in claim 1, wherein the one or more predefined first criteria include the identifier of the virtualised interface such that virtual address translation for a particular I/O operation is selectively performed at the memory management unit or the operation management unit in dependence on which virtualised interface is requesting the I/O operation.

14. The data processing system as claimed in claim 1, wherein the one or more predefined first criteria includes the type of I/O operation.

15. The data processing system as claimed in claim 5, wherein the one or more predefined second criteria includes the type of I/O operation.

16. The data processing system as claimed claim 1, wherein the input and/or output device is a network interface device.

17. The data processing system as claimed in claim 15, wherein the input and/or output device is a network interface device,
and wherein the I/O operation types include DMA reads, DMA writes, control path operations, data path operations and an interrupts.

18. The data processing system as claimed in claim 16, wherein the one or more predefined first criteria are chosen such that virtual address translation for I/O operations belonging to a control path are performed at the memory management unit and virtual address translation for I/O operations belonging to the data path are performed at the operation management unit.

19. The data processing system as claimed in claim 18, wherein I/O operations belonging to the control path include descriptor fetches, interrupts, configuration operations and notification operations.

20. The data processing system as claimed in claim 16, wherein the one or more predefined first criteria are chosen such that virtual address translation for data transmission operations and interrupts are performed at the memory management unit and virtual address translation for data reception operations, descriptor operations and completion operations are performed at the operation management unit.

21. The data processing system as claimed in claim 1, wherein at least one of the second software domains supports at least one application having a lower privilege level than its supporting domain, each application being granted access to the virtualised interface associated with its supporting domain and to an application memory address space within the address space of the supporting domain.

22. The data processing system as claimed in claim 21, wherein, for I/O operations requested on behalf of an application, the input and/or output device is configured to:
  (i) at the operation management unit, perform translation of an application memory address into a virtual memory address of the supporting domain; and
  (ii) subsequently, invoke the memory management unit to perform virtual address translation of the virtual memory address into a physical memory address.

23. The data processing system as claimed in claim 21, wherein each application is granted direct access to a sub-interface of the virtualised interface of the supporting domain and each sub-interface is assigned a unique identifier.

24. The data processing system as claimed in claim 22, wherein the one or more predefined first criteria are chosen such that the memory management unit performs virtual address translation of the virtual memory address into a physical memory address.

25. The data processing system as claimed in claim 1, wherein the predefined criteria are stored at the input and/or output device.

26. The data processing system as claimed in claim 25, wherein a device driver supported at the first software domain is configured to maintain the predefined criteria stored at the input and/or output device.

27. The data processing system as claimed in claim 1, wherein the input and/or output device comprises a plurality of the said operation management units, each operation management unit being supported at a respective one of the virtualised interfaces, and, on invoking the operation management unit, the input and/or output device is configured to invoke the instance of the operation management unit supported at the virtualised interface requesting the I/O operation.

28. The data processing system as claimed in claim 1, wherein the first software domain maintains a memory address translation table.

29. The data processing system as claimed in claim 28, wherein the input and/or output device maintains a copy of the translation table.

30. The data processing system as claimed in claim 1, wherein the first software domain is a hypervisor and the second software domains are guest operating systems supported by the hypervisor.

31. The data processing system as claimed in claim 1, wherein the first software domain is an operating system kernel and the second software domains are user level entities supported by the kernel.

32. The data processing system as claimed in claim 1, wherein the input and/or output device is a PCI Express device and the virtualised interfaces of the input and/or output device are provided in accordance with the PCI-IOV specification.

33. The data processing system as claimed in claim 2, wherein each identifier is a PCI Requester ID.

34. The data processing system as claimed in claim 6, wherein the predefined first and second criteria are the same criteria.

35. The data processing system as claimed in claim 5, wherein the predefined criteria are stored at the input and/or output device.

36. The data processing system as claimed in claim 5, wherein the input and/or output device comprises a plurality of the said operation management units, each operation management unit being supported at a respective one of the virtualised interfaces, and, on invoking the operation management unit, the input and/or output device is configured to invoke the instance of the operation management unit supported at the virtualised interface requesting the I/O operation.

37. A method for handling virtual memory addresses at a data processing system comprising a memory and an input and/or output device, the data processing system supporting (a) at least one privileged software domain and (b) a plurality of non-privileged software domains each having a virtual memory address space and each being associated with a respective virtualised interface of the input and/or output device, the method comprising:
  receiving at a virtualised interface of the input and/or output device at least one virtual memory address from the respective one of the non-privileged software domains;
  the virtualised interface requesting an I/O operation using the at least one virtual memory address;
  determining at the input and/or output device whether the I/O operation request meets one or more predefined first criteria;
  and:
    if the one or more first criteria are met, performing translation of the virtual memory address into a physical memory address at an operation management unit of the input and/or output device, the operation management unit having access to an address translation data store of the input and/or output device which is maintained up-to-date by a trusted I/O management entity of the privileged software domain;
    otherwise, invoking a memory management unit of the data processing system to perform translation of the virtual memory address into a physical memory address.

38. The method as claimed in claim 37, further comprising:
  determining at the input and/or output device whether the I/O operation request meets one or more predefined second criteria;
  and:
    if the one or more predefined second criteria are met, the input and/or output device preventing the I/O operation requested by the virtualised interface from accessing areas of the memory which the non-privileged software domain associated with the virtualised interface is not permitted to access;
    otherwise, invoking a memory management unit of the data processing system to perform memory protection for the I/O operation.

* * * * *